US012585991B2

(12) United States Patent　　　　　(10) Patent No.: US 12,585,991 B2
Li　　　　　　　　　　　　　　　　　　　(45) Date of Patent:　　Mar. 24, 2026

(54) DIGITAL RIGHTS MANAGEMENT OF MACHINE LEARNING MODELS

(71) Applicant: Deere & Company, Moline, IL (US)

(72) Inventor: Yueqi Li, San Jose, CA (US)

(73) Assignee: Deere & Company, Moline, IL (US)

( * ) Notice: Subject to any disclaimer, the term of this patent is extended or adjusted under 35 U.S.C. 154(b) by 858 days.

(21) Appl. No.: 17/888,742

(22) Filed: Aug. 16, 2022

(65) Prior Publication Data

US 2024/0062100 A1　　Feb. 22, 2024

(51) Int. Cl.
G06N 20/00　　　　(2019.01)
G06N 5/04　　　　(2023.01)
(52) U.S. Cl.
CPC .............. G06N 20/00 (2019.01); G06N 5/04 (2013.01)
(58) Field of Classification Search
CPC .......... G06N 20/00; G06N 5/04; G06N 3/045
See application file for complete search history.

(56) References Cited

U.S. PATENT DOCUMENTS

2022/0245243 A1 * 8/2022 Andreina ............... G06N 3/094

OTHER PUBLICATIONS

Cicco, "Automatic Model Based Dataset Generation for Fast and Accurate Crop and Weeds Detection", 2017 IEEE/RSJ International Conference on Intelligent Robots and Systems (IROS) Sep. 24-28, 2017, Vancouver, BC, Canada. (Year: 2017).*
Kamilaris, "Training Deep Learning Models via Synthetic Data: Application in Unmanned Aerial Vehicles", 2019. (Year: 2019).*
Al-Rubaie et al., "Privacy Preserving Machine Learnings: Threats and Solutions" IEEE Security and Privacy Magazine, 18 pages, dated 2018.
Shan et al., "Fawkes: Protecting Privacy against Unauthorized Deep Learning Models" Proc. of USENIX Security Symposium. 16 pages, dated 2020.

* cited by examiner

*Primary Examiner* — Dave Misir
(74) *Attorney, Agent, or Firm* — Fenwick & West LLP

(57)　　　　　ABSTRACT

Techniques for training an agricultural inference machine learning model to generate valid agricultural inferences of agricultural conditions based on ground truth sensor data that falls within a plurality of ground truth sensor value ranges associated with a particular agricultural area, and to generate invalid or ambiguous agricultural inferences of agricultural conditions based on ground truth sensor data that falls outside of the plurality of ground truth sensor value ranges associated with a particular agricultural area. The agricultural inference machine learning model is trained, based on ground truth sensor data for the particular agricultural area, to determine if the subsequently received ground truth sensor data falls within or outside of that plurality of ground truth sensor value ranges that correspond to the particular agricultural area.

19 Claims, 6 Drawing Sheets

Figure 3:
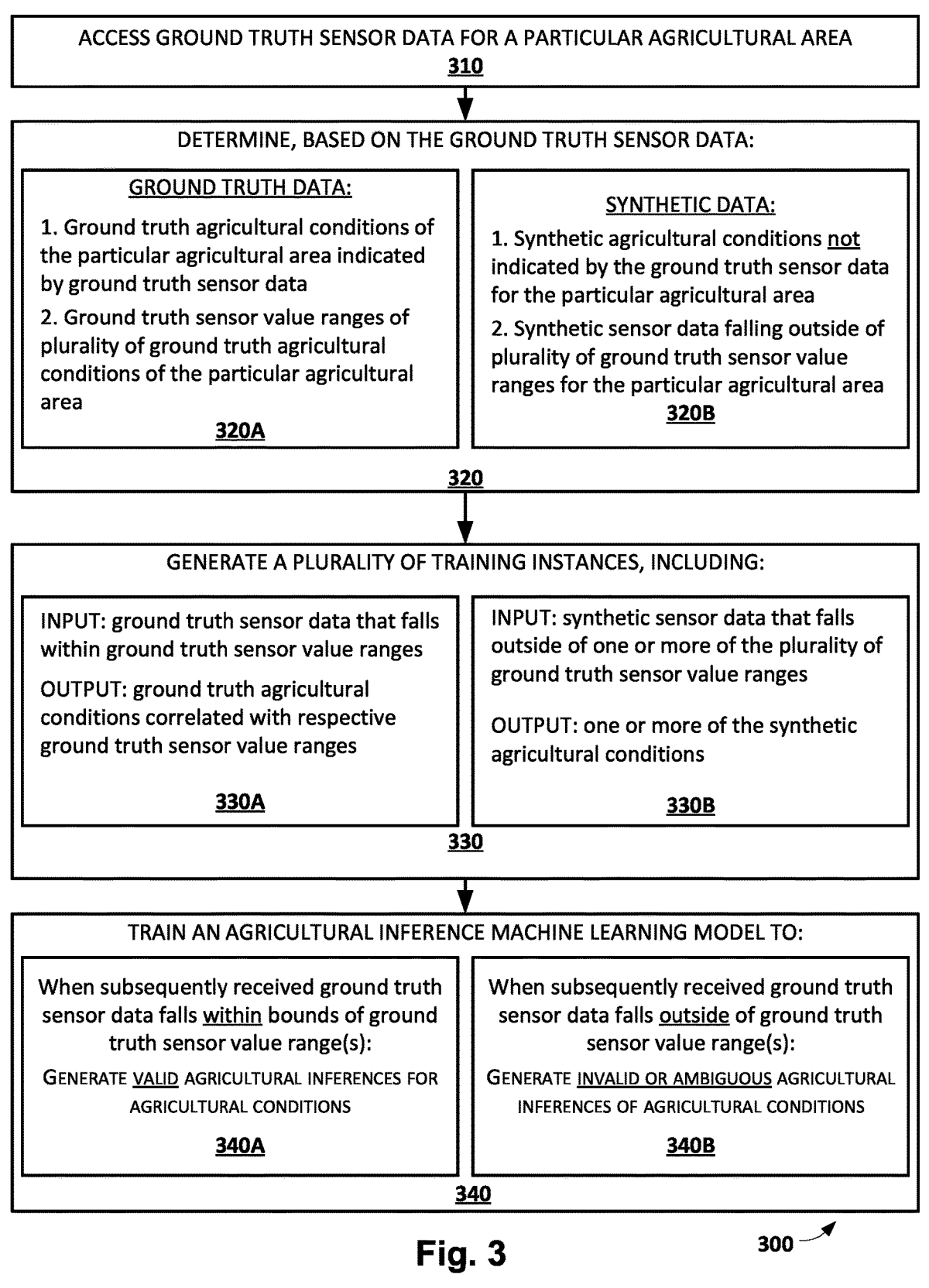

ACCESS GROUND TRUTH SENSOR DATA FOR A PARTICULAR AGRICULTURAL AREA
310

DETERMINE, BASED ON THE GROUND TRUTH SENSOR DATA:

GROUND TRUTH DATA:

1. Ground truth agricultural conditions of the particular agricultural area indicated by ground truth sensor data 2. Ground truth sensor value ranges of plurality of ground truth agricultural conditions of the particular agricultural area

320A

SYNTHETIC DATA:

1. Synthetic agricultural conditions <u>not</u> indicated by the ground truth sensor data for the particular agricultural area 2. Synthetic sensor data falling outside of plurality of ground truth sensor value ranges for the particular agricultural area

320B

320

GENERATE A PLURALITY OF TRAINING INSTANCES, INCLUDING:

INPUT: ground truth sensor data that falls within ground truth sensor value ranges OUTPUT: ground truth agricultural conditions correlated with respective ground truth sensor value ranges

330A

INPUT: synthetic sensor data that falls outside of one or more of the plurality of ground truth sensor value ranges OUTPUT: one or more of the synthetic agricultural conditions

330B

330

TRAIN AN AGRICULTURAL INFERENCE MACHINE LEARNING MODEL TO:

When subsequently received ground truth sensor data falls <u>within</u> bounds of ground truth sensor value range(s):

GENERATE <u>VALID</u> AGRICULTURAL INFERENCES FOR AGRICULTURAL CONDITIONS

340A

When subsequently received ground truth sensor data falls <u>outside</u> of ground truth sensor value range(s):

GENERATE <u>INVALID OR AMBIGUOUS</u> AGRICULTURAL INFERENCES OF AGRICULTURAL CONDITIONS

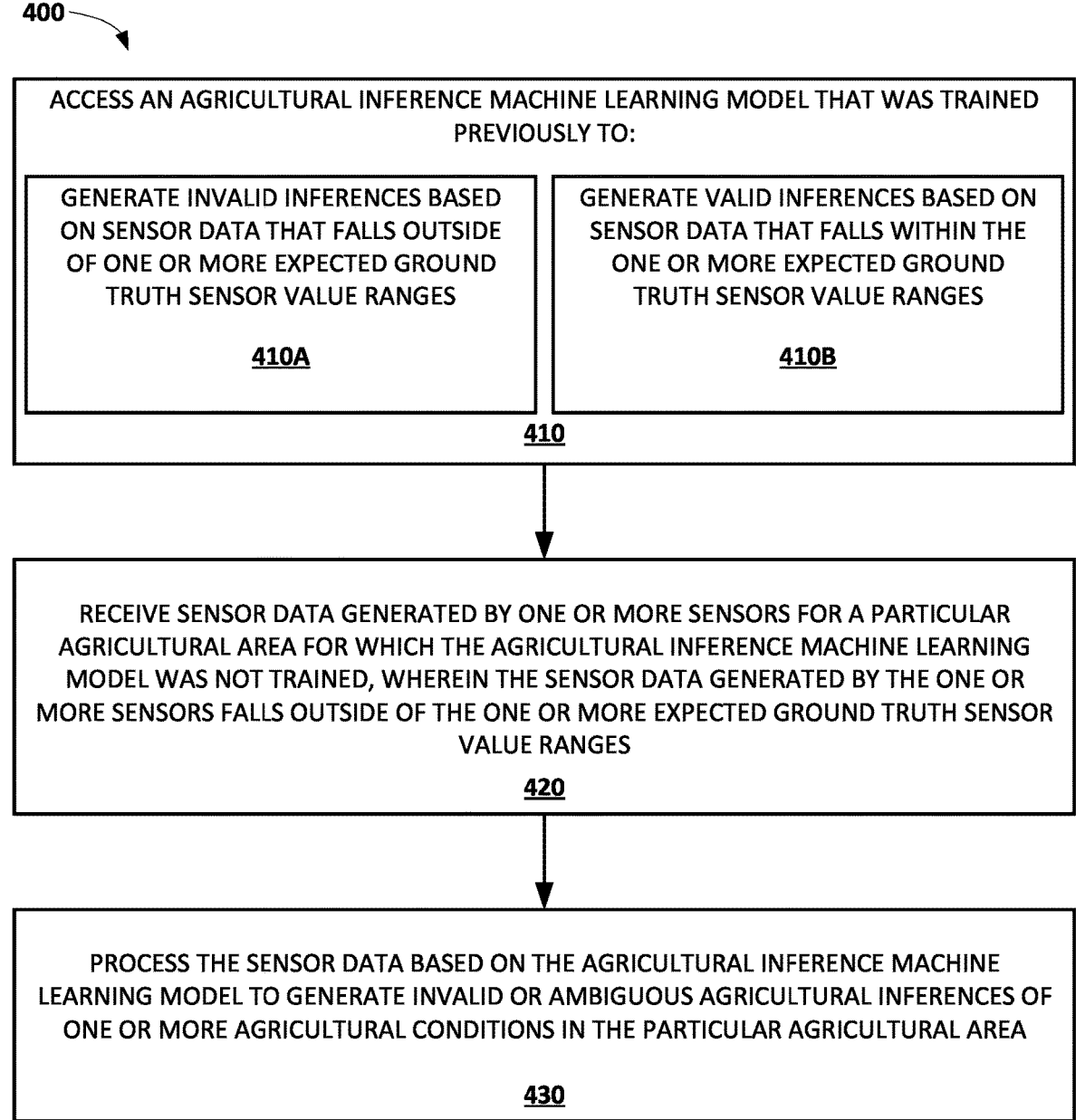

400

ACCESS AN AGRICULTURAL INFERENCE MACHINE LEARNING MODEL THAT WAS TRAINED PREVIOUSLY TO:

GENERATE INVALID INFERENCES BASED ON SENSOR DATA THAT FALLS OUTSIDE OF ONE OR MORE EXPECTED GROUND TRUTH SENSOR VALUE RANGES

410A

GENERATE VALID INFERENCES BASED ON SENSOR DATA THAT FALLS WITHIN THE ONE OR MORE EXPECTED GROUND TRUTH SENSOR VALUE RANGES

410B

410

RECEIVE SENSOR DATA GENERATED BY ONE OR MORE SENSORS FOR A PARTICULAR AGRICULTURAL AREA FOR WHICH THE AGRICULTURAL INFERENCE MACHINE LEARNING MODEL WAS NOT TRAINED, WHEREIN THE SENSOR DATA GENERATED BY THE ONE OR MORE SENSORS FALLS OUTSIDE OF THE ONE OR MORE EXPECTED GROUND TRUTH SENSOR VALUE RANGES

420

PROCESS THE SENSOR DATA BASED ON THE AGRICULTURAL INFERENCE MACHINE LEARNING MODEL TO GENERATE INVALID OR AMBIGUOUS AGRICULTURAL INFERENCES OF ONE OR MORE AGRICULTURAL CONDITIONS IN THE PARTICULAR AGRICULTURAL AREA

DIGITAL RIGHTS MANAGEMENT OF MACHINE LEARNING MODELS

BACKGROUND

Numerous factors may impact soil, animals, and crops (as well as other plants) of an agricultural operation, such as temperature, precipitation, humidity, as well as other naturally-occurring factors such as disease, insects, soil composition and/or quality, and availability of sunlight, to name a few. Human-induced factors can also be impactful, and may include application of pesticides, application of fertilizers, crop rotation, applied irrigation, soil management, crop choice, and disease management, to name a few.

Agricultural operations use myriad types of sensor data to aid them in observing and interpreting conditions affecting the agricultural operation, in order to make agricultural inferences about how past, present, and/or future agricultural practices may contribute to certain outcomes for an agricultural operation. However, agricultural personnel may have great difficulty keeping up with so many separate sensors. Moreover, many agricultural operations take place in rural or less-developed areas, where network connectivity (e.g., internet or satellite communication) is often unavailable or unreliable. It is thus advantageous for many such agricultural operations to use sensor-equipped modular edge computing devices (also referred to as "edge compute nodes" or "edge sensor packages") that include, or communicate over a local area network with a computing system that includes, an agricultural inference machine learning model. In some cases these edge compute nodes may be mountable on agricultural vehicles such as tractors, boom, pivots, etc., and require limited or no network connectivity to be operated.

One challenge of using such edge computing devices is that, without a secure log-in required to access the corresponding sensor data and/or the agricultural inference machine learning model, bad actors may be able to steal a copy of the agricultural inference machine learning model by merely defeating a local encryption of the edge computing device.

SUMMARY

Implementations described herein relate to digital rights management (DRM) of agricultural inference machine learning models. More particularly, but not exclusively, techniques are described herein for training an agricultural inference machine learning model such that: (a) when it has been deployed in an agricultural environment that corresponds to the agricultural environment for which the model was trained, the model will generate valid agricultural inferences; but (b) when it has been deployed in an agricultural environment different from the one for which it was trained, the model will generate invalid or ambiguous agricultural inferences. Consequently, bad actors who do not have permission to run the agricultural inference machine learning model may not receive accurate/valid inferences. Thus, for instance, a copy of an agricultural machine learning model trained to make agricultural inferences for crops grown in a first particular agricultural area may subsequently be deployed in a second particular agricultural area that is different from the first, and thus will generate ambiguous, invalid, or "noisy" agricultural inferences for the bad actor who has deployed the unauthorized copy of the model in the second particular agricultural area that is different from the first. Consequently, the bad actor will neither be able to use the model to generate accurate inferences, nor will the bad actor be able to "hack" the model to operate properly in the agricultural environment in the second particular agricultural area.

In various implementations, the agricultural machine learning model may be trained to learn the various sensor data points and sensor value ranges associated with one or more particular agricultural regions in which it is to be deployed. Similarly, the agricultural machine learning model may be trained to map various sensor data points and sensor value ranges that do not conform with expected values/ranges of the particular agricultural regions to invalid and/or ambiguous (e.g., noisy, nonsensical, etc.) inferred agricultural conditions. Moreover, this may be accomplished further by looking at combinations of sensor data points and/or value ranges for the authorized agricultural regions, and expected mathematical relationships between such, to obtain a more precise understanding of agricultural conditions in the authorized agricultural regions.

In various implementations, a method implemented using one or more processors may include the following operations. Ground truth sensor data for a particular agricultural area is accessed; ground truth agricultural conditions present in the particular agricultural area that are correlated with the ground truth sensor data are determined; a plurality of ground truth sensor value ranges for the ground truth agricultural conditions of the particular agricultural area indicated by the ground truth sensor data are determined; synthetic sensor data that falls outside of the plurality of ground truth sensor value ranges is generated based on the ground truth sensor data and the plurality of ground truth sensor value ranges; a plurality of agricultural conditions are generated based on the ground truth sensor data and the determined ground truth agricultural conditions; a plurality of training instances are generated, the plurality of training instances including: first training instances each including ground truth sensor data input falling within one or more of the plurality of ground truth sensor value ranges and ground truth output corresponding to one or more of the ground truth agricultural conditions that are correlated with the respective one or more of the plurality of ground truth sensor value ranges, and second training instances each including synthetic sensor data input that falls outside of one or more of the ground truth sensor value ranges and synthetic output corresponding to one or more of the synthetic agricultural conditions; and an agricultural inference machine learning model is trained based on the plurality of training instances to: generate valid agricultural inferences of agricultural conditions based on subsequently received ground truth sensor data when the subsequently received ground truth sensor data includes sensor data values that fall within the plurality of ground truth sensor value ranges; and generate invalid or ambiguous agricultural inferences of agricultural conditions based on the subsequently received ground truth sensor data when the subsequently received ground truth sensor data includes sensor data values that fall outside the plurality of ground truth sensor value ranges.

In some implementations, the ground truth sensor data includes vision data capturing the particular agricultural area and the synthetic sensor data includes synthetic vision data depicting one or more of the plurality of synthetic agricultural conditions.

In some implementations, the plurality of training instances further includes one or more third training instances each including additional synthetic sensor data input and synthetic output corresponding to one or more of the synthetic agricultural conditions, wherein the additional synthetic sensor data input includes at least two synthetic sensor data values that fall within corresponding ground truth sensor value ranges and exhibit a threshold level of difference in covariance compared to observed covariance between the corresponding ground truth sensor value values.

In some implementations, ground truth sensor data for one or more different agricultural areas may be accessed. In some implementations, this ground truth sensor data for the one or more different agricultural areas may be used in determining the plurality of ground truth sensor value ranges for the agricultural conditions of the particular agricultural area. In some implementations, this ground truth sensor data for the one or more different agricultural areas may be used to generate the synthetic sensor data based on at least a portion of the additional ground truth sensor data indicating one or more additional ground truth agricultural conditions not included in the determined plurality of ground truth agricultural conditions. In some such implementations, the plurality of ground truth sensor value ranges is further determined based on this at least the portion of the additional ground truth sensor data.

In some implementations, generating the synthetic sensor data includes substituting a noise signal for one or more of the sensor values included in the ground truth sensor data.

In some implementations, training the agricultural inference machine learning model to generate the valid agricultural inferences of agricultural conditions includes training the agricultural inference machine learning model to generate an indication of an operational practice associated with a predicted change in at least one of the sensor values.

In some implementations, the plurality of synthetic agricultural conditions are anomalous for the particular agricultural area.

In some implementations, the plurality of synthetic agricultural conditions contrast with the ground truth sensor data.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

Various implementations can include a system that includes processor(s) operable to execute instructions stored in transitory or non-transitory memory to perform a method, such as one or more of the methods described herein. Similarly, transitory and non-transitory computer-readable medium may be provided with instructions that cause processor(s) to perform techniques described herein.

BRIEF DESCRIPTION OF THE DRAWINGS

FIG. 3 illustrates an example process for training an agricultural inference machine learning model, as described herein.

FIG. 4 illustrates an example process for processing sensor data based on an agricultural inference machine learning model to generate valid or invalid inferences based on sensor data that falls within or falls outside of one or more expected ground truth sensor value ranges.

DETAILED DESCRIPTION

Figure 1:
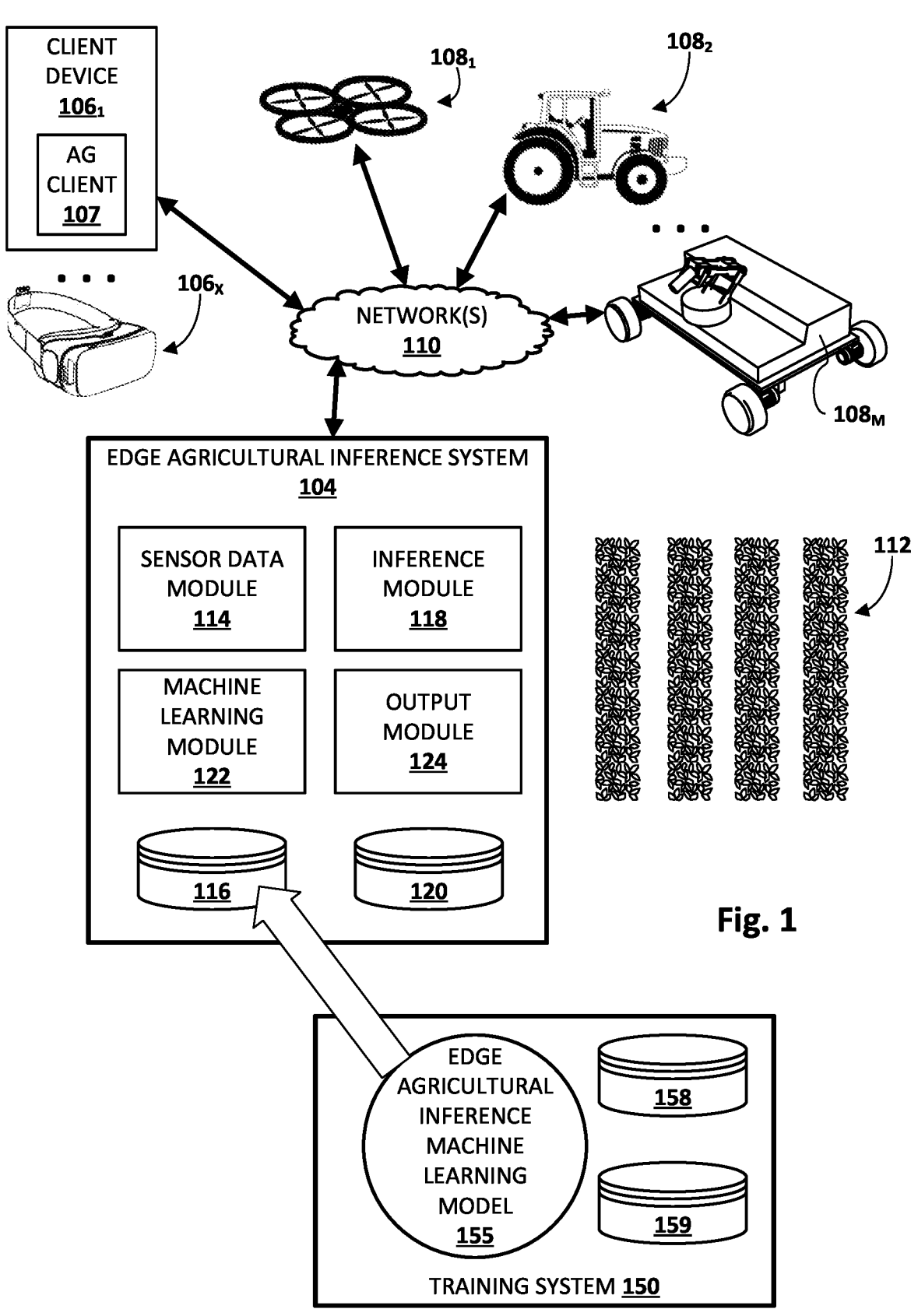
FIG. 1 schematically illustrates an example environment in which one or more selected aspects of the present disclosure may be implemented, in accordance with various implementations.

FIG. 1 schematically illustrates an example environment in which one or more selected aspects of the present disclosure may be implemented, in accordance with various implementations. The example environment includes an edge agricultural inference system 104, a plurality of client devices 1061-$x$, human-controlled and/or autonomous farm equipment 1081-$m$, and one or more fields 112 that are used to grow various types of crops or used for other agricultural functions (e.g., composting, soil remediation, fallowing, etc.).

In various implementations, a distributed computing network is formed by client device(s) 106, edge agricultural inference system 104, various pieces of farm equipment 108 that are in network communication with one another via one or more local area networks ("LANs", e.g., Wi-Fi, Ethernet, various mesh networks) and/or personal area networks ("PANs", e.g., Bluetooth), indicated generally at 110. In some implementations, network(s) 110 may additionally include wide area networks ("WANs"). However, the components described with respect to edge agricultural inference system 104 in FIG. 1 can be configured to wirelessly communicate solely via the local and/or personal area networks, in order to accommodate the many rural and remote areas where much agricultural work is done, and where there is frequently low or no reliable internet access.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Each of client devices 106, edge agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or edge agricultural inference system 104 may be distributed across multiple computer systems.

Each client device 106 (and in some implementation, some farm equipment 108), may operate a variety of different applications that may be used, for instance, to obtain and/or analyze various agricultural inferences (real time and delayed) that were generated using techniques described herein. For example, a first client device 1061 operates agricultural ("AG") client 107 (e.g., which may be standalone or part of another application). Another client device 106x may take the form of a HMD that is configured to render 2D and/or 3D data to a wearer as part of a VR immersive computing experience. For example, the wearer of client device 106x may be presented with 3D point clouds representing various labels of interest, such as crops, weeds, crop yield predictions, weather data, etc. The wearer may interact with the presented data, e.g., using HMD input techniques such as changing gaze directions, blinking, etc.

Individual pieces of farm equipment 1081-$m$ may take various forms. Some farm equipment 108 may be operated at least partially autonomously, and may include, for instance, an unmanned aerial vehicle 1081 that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot 108$_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor 108$_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

In some implementations, one or more edge computing nodes (not depicted) may be included in, mounted on, or otherwise attached to or integrated with farm equipment 108. An edge computing node may be a modular and/or portable data processing device that, for instance, may be carried through an agricultural field 112. For example, one or more edge computing nodes may be mounted on a device designed to attach to a piece of farm equipment (e.g., on a boom affixed to tractor 108$_2$ or on a truck) that is driven through field 112 and/or carried by agricultural personnel. Edge computing nodes may include logic such as processor(s), application-specific integrated circuits (ASICs), field-programmable gate arrays (FPGA), etc., configured with selected aspects of the present disclosure to capture and/or process various types of sensor data to make agricultural inferences.

In some examples, one or more of the components depicted as part of the edge agricultural inference system 104 may be implemented in whole or in part on a single edge computing node, across multiple edge computing nodes, and/or across other computing devices, such as client device(s) 106. Thus, when operations are described herein as being performed by/at edge agricultural inference system 104, it should be understood that those operations may be performed by one or more edge computing nodes, and/or may be performed by one or more other computing devices at the edge, such as on client device(s) 106.

In various implementations, edge agricultural inference system 104 may include a sensor data module 114, inference module 118, machine learning module 122, and output module 124. Edge agricultural inference system 104 may also include one or more edge databases 116, 120 for storing various data used by and/or generated by modules 114, 118, and/or 122, such as vision and/or other sensor data gathered by farm equipment 1081-$m$, agricultural inferences, machine learning models that are applied and/or trained using techniques described herein to generate agricultural inferences, and so forth. In some implementations one or more of modules 114, 118, 122, and 124 may be omitted, combined, and/or implemented in a component that is separate from edge agricultural inference system 104.

The example environment of FIG. 1 may also include a remote training system 150 that may be used to train an edge agricultural inference machine learning model 155 to generate agricultural inferences about agricultural conditions present in the one or more agricultural area(s) 112 for which corresponding ground truth sensor data has been gathered. The training system 155 may include the edge agricultural inference machine learning model 155 and one or more databases 158, 159 which may be used to store ground truth sensor data for particular agricultural areas and/or other machine learning models which process the ground truth sensor data and/or assist in training the edge agricultural inference machine learning model 155. Once the training system 150 trains the edge agricultural inference machine learning model 155, the trained edge agricultural inference machine learning model 155 may be loaded to and stored in the edge agricultural inference system 104, for example in edge database 116.

Some methods for thwarting bad actors from stealing and using the technology deployed in the edge agricultural inference system 104 may rely upon user authentication over the Internet or other wide area network ("WAN") access. However, given that Internet or other WAN access at the edge may be unreliable, different methods for preventing bad actors from using components of edge agricultural inference system 104 may be deployed at the edge in agricultural settings. Thus, digital rights management (DRM) systems, methods, and processes which are disclosed in more detail below address training of an edge agricultural inference machine learning model 155 included in or otherwise used by the edge agricultural inference system 104 so that, when it has been deployed in an agricultural environment different from the one for which it was trained, the model will generate invalid agricultural inferences. Consequently, bad actors who do not have permission to run the agricultural inference machine learning model may not receive accurate/valid inferences.

A trained edge agricultural inference machine learning model 155 may be included in an edge database, for example edge database 116, of the edge agricultural inference system 104. The edge agricultural inference machine learning model 155 may be trained by training system 150 and loaded onto the edge agricultural inference system 104. For example, a manufacturer associated with edge agricultural inference machine learning model 155 or training system 150 may use training system 150 to train an instance of edge agricultural inference machine learning model 155 such that it is tailored to usage in one or more "authorized agricultural areas", yet less usable or not at all usable in other agricultural areas, which may be treated as "unauthorized agricultural areas". The edge agricultural inference machine learning model 155 can then be stored in edge database 116 of edge agricultural inference system 104, for example, before or after an authorized party purchases the edge agricultural inference system 104. The edge agricultural inference machine learning model 155 can loaded to the edge agricultural inference system 104 for storage in in edge database 116 via one or more busses, cables, or networks (e.g., "WANs", "PANs", or "LANs") available to the edge agricultural inference system 104 during the loading process.

In some implementations, after edge agricultural inference machine learning model 155 has been loaded to edge database 116 of edge agricultural inference system 104, authorized users of edge agricultural inference system 104 may desire an update to their stored edge agricultural inference machine learning model 155. For example, a sudden shift in weather patterns or a desire to grow new, exotic crops may require farm personnel on an authorized farm to request an update to their stored edge agricultural inference machine learning model 155. In such cases, the authorized users of edge agricultural inference system 104 may be able to request, from the manufacturer or an authorized retailer, an update to certain weights of, the edge agricultural inference machine learning model 155. In some implementations, these updates may be received remotely over one or more networks, and in some cases may be implemented using processes such as federated learning. For example, the stored edge agricultural inference machine learning model 155 may be replaced or updated each time the edge agricultural inference system 104 re-connects to Wi-Fi and an authorized log in to training system 150, or one or more components associated with such, is detected.

Accordingly, methods are disclosed herein for training such an edge agricultural inference machine learning model 155 to be deployed in an edge agricultural inference system 104, and using such a trained edge agricultural inference machine learning model 155 with an edge agricultural inference system 104. Consequently, farm personnel in "authorized" agricultural areas using edge agricultural inference system 104 will be able to accurately use the trained edge agricultural inference machine learning model 155 to generate "valid" agricultural inferences about agricultural conditions in those "authorized" agricultural areas from which ground truth sensor data was collected. In contrast, bad actors deploying edge agricultural inference system 104 in "unauthorized" agricultural areas will have limited or no functional usage of the trained edge agricultural inference machine learning model 155. These bad actors instead will receive "invalid" or ambiguous agricultural inferences about agricultural conditions for those "unauthorized" agricultural areas from which the bad actor's gathered ground truth sensor data.

In other words, the edge agricultural inference machine learning model 155 may be trained to differentiate between ground truth sensor data gathered in "authorized" and "unauthorized" agricultural areas. Consequently, the model 155 may function so that users from "authorized" agricultural areas are effectively treated as authorized users of edge agricultural inference system 104 and therefore receive "valid" output agricultural inferences about agricultural conditions for these "authorized" agricultural areas. In contrast, users from "unauthorized" agricultural areas will effectively be treated as unauthorized users (e.g., bad actors) of edge agricultural inference system 104 and therefore receive "invalid" or ambiguous output agricultural inferences about agricultural conditions for these "unauthorized" agricultural areas.

Edge agricultural inference machine learning model 155 may take various forms, such as one or more recurrent neural networks (RNNs), long short-term memory (LSTM) networks (including bidirectional), gated recurrent unit (GRU) networks, transformer networks, feed-forward neural networks, convolutional neural networks (CNNs), support vector machines, random forests, decision trees, etc. Edge agricultural inference machine learning model 155 may be trained by training system 150 based on ground truth sensor data gathered for "authorized" agricultural areas using one or more processes described herein. In some implementations, as will be discussed in more detail herein, the training system 150 may also train the edge agricultural inference machine learning model 155 based on ground truth sensor data corresponding to one or more "unauthorized" agricultural areas, e.g., to assist the model 155 in learning to differentiate between "authorized" and "unauthorized" agricultural areas, or in learning to output certain "invalid" or ambiguous agricultural inferences.

For example, training system 150 may include one or more first databases 158 that include ground truth sensor data obtained from farm equipment 108, from farm personnel (e.g., via AG client 107), and/or from national, local, or regional authorities or other holders of ground truth sensor data for one or more given "authorized" agricultural areas. Training system 150 may also include one or more second databases 159 that include one or more machine learning models used to generate training data and/or otherwise monitor and modify the training of the edge agricultural inference machine learning model 155. For example, the one or more second databases 159 may include one or more ground truth sensor data analysis models trained to determine various measures, models, and conditions that correspond to the ground truth sensor data, as well as one or more generator models trained to generate ground truth and synthetic training data for training the edge agricultural inference machine learning model 155. This training process of the edge agricultural inference machine learning model 155 will be discussed in more detail below with respect to FIGS. 2 and 3.

The edge agricultural inference machine learning model 155 may be trained based on the types of ground truth sensor data described herein to determine a presence or lack of presence, and/or degree or other particular measure, of one or more agricultural conditions in the agricultural area(s) 112. Agricultural conditions may be determined or inferred by the trained edge agricultural inference machine learning model 155 include indications of crop conditions, climate conditions, edaphic conditions, landform conditions, and so forth. Crop conditions may include, for instance, information about crop identification, crop phenotype expression, crop life stage, crop rate of growth, expected crop yield, weed identification and prevalence, plant disease, and so forth.

Climate conditions may include, for instance, precipitation levels/frequencies, temperatures, sunlight exposure, wind, humidity, evapotranspiration (the sum of evaporation from the land surface plus transpiration from plants), and so forth. Edaphic conditions may include various information about soil, such as soil composition, soil pH, soil moisture, fraction data, soil organic carbon content, etc. Landform conditions may include, for instance, elevation, slope, distance to water, the presence of man-made materials or structures, etc. In general, any condition which may have any relevance to or influence on crop growth and health in a particular agricultural area and which may be determined based on analyzing ground truth sensor data may be agricultural conditions that the edge agricultural inference machine learning model 155 is capable of determining and/or inferring.

Agricultural inferences about agricultural conditions can also indicate one or more changes and/or rates of change in agricultural conditions determined based on the ground truth sensor data across and between various periods of time (e.g., as indicated by time-stamped instances of sensor data and/or some other sensor data values that indicate time passage, such as temperature cycles between seasons). In some implementations, the edge agricultural inference machine learning model 155 may be trained such that the agricultural inferences of agricultural conditions indicated by its output can also include indications of operational practices associated with predicted changes in one or more sensor data values. For example, an agricultural inference indicated by the output of the trained edge agricultural inference machine learning model 155 may indicate an "underwatering" condition likely to occur if the current irrigation practices being employed are not changed.

In some implementations, the agricultural inferences of agricultural conditions indicated by the output of the trained edge agricultural inference machine learning model 155 can also include synthetic data generated based on the ground truth sensor data. For example, ground truth imagery included in the ground truth sensor data may be modified or otherwise used to generate synthetic imagery that depicts various instances of agricultural conditions for which there may be no ground truth vision data, or for which the ground truth vision data is low quality.

Once the edge agricultural inference machine learning model 155 has been trained based on ground truth sensor data for one or more particular agricultural area(s) 112, and loaded to the edge agricultural inference system 104, edge agricultural inference system 104 may begin to use the trained edge agricultural inference machine learning model 155 to generate inferences about agricultural conditions in a given agricultural area in which the edge agricultural inference system 104 is deployed, based on processing ground truth sensor data gathered from/for that given agricultural area. For example, one or more components of edge agricultural inference system 104, such as sensor data module 114 and/or machine learning module 122 may obtain and process ground truth sensor data generated based on output of one or more sensors deployed in one or more of the agricultural areas 112, such as one or more sensors deployed on farm equipment 108, or from farm personnel input received via AG client(s) 107. This ground truth sensor data may be stored in one or more edge databases of edge agricultural inference system 104, for example edge database 120.

One or more other components of edge agricultural inference system 104, such as sensor data module 114 or machine learning module 122 will then process the ground truth sensor data to generate one or more instances of ground truth sensor data that are usable by the trained edge agricultural inference machine learning model 155 stored in edge database 116. For example, the ground truth sensor data stored in edge database 120 may be processed to generate one or more instances of ground truth sensor data that are represented as a time-series sequence of instances of captured ground truth sensor data. As another example, if the ground truth sensor data stored in edge database 120 includes vision data, then sensor data module 114 and/or machine learning module 122 may process the stored ground truth vision data to generate one or more image embeddings (or vectors). For example, this processing may include applying all or a subset of the ground truth images captured by vision sensors deployed in the agricultural area(s) 112 as input across at least a portion of a machine learning model such as a CNN to generate the image embeddings/vectors. This CNN machine learning model, or other appropriate image processing machine learning model, may be stored for example in edge database 116 or 120 and used by machine learning module 122 to process these ground truth images based on a determination by the sensor data module 114 and/or the machine learning module 122 that the ground truth sensor data stored in edge database 120 includes vision data, or includes vision data with certain properties (e.g., high or low resolution vision data, or images with obstructions or unusual features, which may be difficult or time-consuming for the trained edge agricultural inference machine learning model 155 process otherwise).

Once the obtained ground truth sensor data is stored at edge agricultural inference system 104 (e.g., in edge database 120) and processed by one or more modules of edge agricultural inference system 104 (e.g., sensor data module 114 and/or machine learning module 122) into one or more instances of ground truth sensor data that are usable by the trained edge agricultural inference machine learning model 155 stored at edge agricultural inference system 104 (e.g., in edge database 116), then the trained edge agricultural inference machine learning model 155 can be used (e.g., by machine learning module 122 and/or inference system 118) to process these one or more instances of ground truth sensor data in order to generate agricultural inferences about agricultural conditions present in the agricultural area(s) that correspond to this ground truth sensor data.

This ground truth sensor data may be applied, e.g., continuously and/or periodically by inference module 118 and/or machine learning module 122, as input across one or more machine learning models stored in edge database 120 to generate output indicative of one or more agricultural inferences for one or more agricultural conditions determined based on this ground truth data. In some implementations, these inferences may then be stored at the edge agricultural inference system 104 for later use by one or more components of edge agricultural inference system 104. Inference module 118 or another module, such as output module 124, may then process the output (and/or stored) data indicative of these agricultural inferences of agricultural conditions, for example using one or more other machine learning models stored in edge database 116, to generate targeted agricultural inferences of agricultural conditions (and/or agricultural inferences of targeted agricultural conditions) that are determined to be relevant to farm operations in the given agricultural area(s).

Thus, for example, the edge agricultural inference machine learning model 155 may be trained to generate a first output based on current ground truth sensor data indicates an agricultural inference of an agricultural condition that include infers that currently waterlogged soil will dry at a rate defined by an equation F(X(0.7T)). The edge agricultural inference machine learning model 155 may also be trained to generate a second output which, for example, is generated based on past ground truth sensor data and/or a mixture of past and current ground truth sensor data, or is a previously determined agricultural inference that was subsequently stored in edge database 120. This may include an agricultural inference of an agricultural condition that indicates that soil in the agricultural area(s) 112 has been waterlogged on-and-off during the entire growing season. Using these two agricultural inferences, inference module 118 (and/or one or more machine learning models stored in edge database 116 and used by inference module 118) may infer that currently growing crops in the agricultural area(s) are likely to have spent much of their growing season overwatered, and therefore calculate an expected reduction in crop yield from the crops grown in the agricultural area(s) 112. Thus, rather than merely providing the output F(X (0.7T)) equation to the output module 124 for presentation to the farm personnel, the inference module 118 may additionally or alternatively provide "big picture" agricultural inferences of agricultural conditions based on multiple past or present outputs of the edge agricultural inference machine learning model 155, as well as other data available to the edge agricultural inference system 104, so that farm personnel are not confused by the sheer volume of output data and/or its exceedingly technical nature.

Output module 124 will receive the agricultural inferences of agricultural conditions which have been determined by inference module 118 to be most relevant, readable, and/or useful to the farm personnel performing agricultural operations in the given agricultural area(s). Output module 124 may transform these agricultural inferences of agricultural conditions that are to be presented to the farm personnel into output data capable of being displayed or otherwise relayed to the farm personnel at one or more user interfaces associated with edge agricultural inference system 104, such as at one or more user interfaces of client device(s) 106. The output module 124 may then transmit this output data to the computing devices hosting the targeted user interfaces (e.g., to client device(s) 106 via AG client(s) 107), where farm personnel may view or otherwise take in the data and determine how to handle their agricultural operations based on this output data.

In this specification, the term "database" and "index" will be used broadly to refer to any collection of data. The data of the database and/or the index does not need to be structured in any particular way and it can be stored on storage devices in one or more geographic locations. Thus, for example, database(s) 116, 120, 158, and 159 may include multiple collections of data, each of which may be organized and accessed differently.

Figure 2:
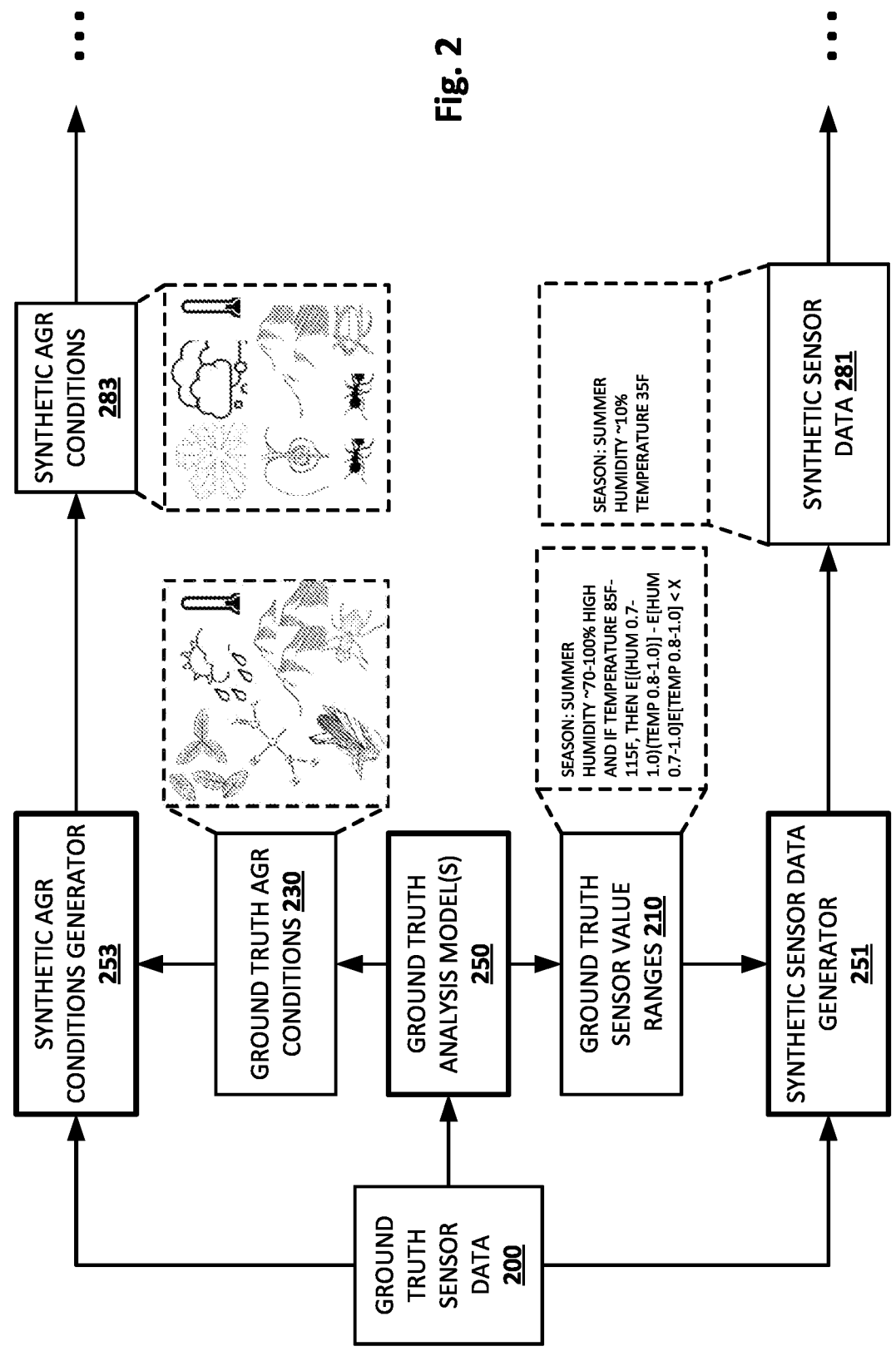
FIG. 2 depicts an example process pipeline for generating machine learning model training data for training an agricultural inference machine learning model in accordance with various implementations described herein.

FIG. 2 depicts an example process pipeline for generating machine learning model training data for training an agricultural inference machine learning model in accordance with various implementations described herein. Various components depicted in FIG. 2 may be implemented using any combination of software and hardware, and in some cases may be implemented at least in part on the edge agricultural inference system 104 and/or the training system 150 of FIG. 1. The machine learning model trained based on the training data generated through processes described with respect to FIG. 2 may be, for example, the edge agricultural inference machine learning model 155 of FIG. 1. Moreover, the configuration of FIG. 2 is for illustrative purposes and is not meant to be limiting.

The schema of FIG. 2 includes one or more ground truth analysis model(s) 250, a synthetic sensor data generator 251, and a synthetic agricultural conditions generator 251. The schema shown in FIG. 2 demonstrates one example of how ground truth sensor data 200 for one or more particular agricultural areas may be processed in order to generate training data that can be used to train an agricultural inference machine learning model (not depicted), such as the agricultural inference machine learning model 155 of FIG. 1. The training of the agricultural inference machine learning model will be discussed in more detail with respect to FIG. 3.

Ground truth sensor data 200 is applied to one or more ground truth analysis models 250. Ground truth sensor data 200 can include ground truth observational data from a variety of authoritative sources for one or more particular agricultural areas over a plurality of time periods (e.g., plurality of growing seasons), such as government regulatory or outreach programs, agricultural personnel, and sensors and software implemented on robot(s), aerial drones, and so forth. This ground truth observational data may include vision and other sensor data and may be associated with individual agricultural regions, sub-regions, or even fields or particular positional coordinates within such field (s), and may include various types of information derived from user input and sensor output related to soil composition (e.g., soil aeration, moisture, organic carbon content, etc.), agricultural management (e.g., crop plantings, plant identification, crop rotation, crop yields, irrigation, tillage practices, weeding practices, etc.), terrain (e.g., land elevation, slope, erosion, etc.), climate or weather (e.g., precipitation levels/frequency, temperatures, sunlight exposure, wind, humidity, etc.), and any other features, occurrences, or operational practices that could affect the agricultural conditions of the field(s) and which could be identified based on analyzing sensor output and/or user input and/or generated based on such identified data.

Additionally, the ground truth sensor data 200 can indicate a presence or lack of one or more agricultural conditions that generally are or are not expected to be found in the particular agricultural area, or are or are not expected to be found in the particular field(s) in which authorized user deploy a edge agricultural inference machine learning model trained based on the ground truth sensor data 200. For instance, certain types of pesticides or applications of such, harvesting methods, quarantine or treatment methods for hazardous conditions, soil materials, etc. may be banned, mandated, or otherwise regulated for a particular agricultural area or farm(s) in the particular agricultural area by a national or local government, co-op board, farm owner, or other regulatory agency or authority tasked with regulating agricultural conditions for the particular agricultural area or particular farm(s). For example, ground truth sensor data 200 may indicate a historical presence of a pesticide recently banned in the region. However, the ground truth sensor data 200 may also indicate that recent ban of the pesticide in some way such that the ground truth sensor data 200 for the particular agricultural area in Alabama, on the whole, may indicate that there is no or low presence of the recently banned pesticide is expected to be (e.g., currently or in the future) found in subsequent instances ground truth sensor data.

In some implementations, ground truth analysis models 250 take the form of one or more of the machine learning models stored in edge database 120. In some implementations, one or more layers of one or more of the machine learning models stored in edge database 120 may constitute the ground truth analysis models 250. In other implementations, the ground truth analysis model(s) 250 may include machine learning model(s) stored in a remote database and used to generate training data for training the agricultural inference machine learning model before the agricultural inference machine learning model is stored and/or deployed at the edge.

The ground truth sensor data 200 can be processed using the ground truth analysis model(s) 250 to determine a plurality of ground truth agricultural conditions 230 and a plurality of ground truth sensor value ranges 210 that correspond to the ground truth sensor data 200 for the one or more particular agricultural areas.

The ground truth sensor value ranges 210 include value ranges, as well as models that describe the expected mathematical relationships between these value ranges, for ground truth sensor data 200 for the corresponding one or more particular agricultural areas. The ground truth sensor value ranges 210 can include expected ranges and/or mathematical relationships between sensor data values and/or value ranges based that reflect the plurality of ground truth agricultural conditions 230 of the particular agricultural area corresponding to the ground truth sensor data 200. For example, the plurality of ground truth sensor value ranges 210 may dictate that measurements of air temperature and measurements of relative humidity for a particular agricultural area during one or more particular time periods (e.g., the growing season, Winter, the afternoon of March 3rd, etc.) should exhibit a particular covariance, correlation, or other mathematical relationship with respect to one another. For example, the plurality of ground truth sensor value ranges 210 may dictate that higher humidity should correlate with higher temperatures during summer in a particular region of Texas, and that the correlation between temperature and humidity should vary in a particular way during particular weeks of the summer (e.g., the second week of June should be hotter and more humid than the first week of June).

Additionally or alternatively, the plurality of ground truth sensor value ranges 210 may dictate that the measurements of air temperature and the measurements of relative humidity for the particular agricultural area should exhibit a particular covariance, correlation, or other mathematical relationship with respect to one another when certain sensor data indicates that a particular condition is present or that one or more criteria are satisfied. For example, the plurality of ground truth sensor value ranges 210 may indicate that air temperature and relative humidity for this particular agricultural area (e.g., Texas, a particular part of Texas, etc.) should display a negative covariance when these sensor measurements and/or other sensor data indicates increases in soil moisture above a threshold level. Thus, the plurality of ground truth sensor value ranges 210 may indicate a "rule" such as "if there is heavy rain, the temperature will fall despite the high humidity" by indicating certain expected mathematical relationships between various sensor measurements.

In some implementations, the plurality of ground truth sensor value ranges 210 may further be determined based on accessing additional ground truth sensor data for an agricultural area other than the particular agricultural area for which the agricultural inference machine learning model is to be trained. For example, if the particular agricultural area is in Northwest Texas, the plurality of ground truth sensor value ranges 210 for the ground truth sensor data 200 gathered from Northwest Texas may be determined, at least in part, based on additional ground truth sensor data for Northeast Texas. Thus, the plurality of ground truth sensor values 210 could be determined more precisely for Northwest Texas, by ensuring that the additional ground truth sensor data from relatively nearby Northeast Texas would not also fall within the plurality of ground truth sensor values 210.

In some implementations, these ground truth sensor value ranges 210 can be processed using a synthetic sensor data generator 251, e.g., which may or may not apply a machine learning model, to generate synthetic sensor data 281. This synthetic sensor data 281 includes sensor data that is outside the bounds of the value ranges included in the plurality of ground truth sensor value ranges 210. In other words, the plurality of ground truth sensor value ranges 210 will indicate which sensor value ranges should be observed in ground truth sensor data 200 for the particular agricultural area(s). However, at least a portion of the synthetic sensor data 281 will indicate some sensor value, sensor value range, or other mathematical relationship between sensor value(s) and/or range(s) that "violates" what the plurality of ground truth sensor value ranges 210 say should be found in ground truth sensor data 200. In some implementations, generating the synthetic sensor data 281 may include substituting a noise signal for one or more of the sensor values included in the ground truth sensor data.

In some implementations, the synthetic sensor data 281 may be generated to include a plurality of ground truth sensor value ranges that correspond to a different particular agricultural area. For example, when the plurality of ground truth sensor value ranges 210 correspond to Texas, synthetic sensor data generated from ground truth sensor data for, and/or generated based on a plurality of ground truth sensor value ranges for, a sufficiently different region (agriculturally-speaking), such as Thailand, may be included in the synthetic sensor data 281. The different agricultural area in Thailand may be selected based on ground truth sensor data from Thailand indicating one or more additional ground truth agricultural conditions that are different from the plurality of ground truth agricultural conditions indicated for the particular agricultural area by the ground truth sensor data. In such an example, the instances of ground truth sensor data for Thailand included in the synthetic sensor data 281 may be selected based on determining that they "violate" some expectation dictated by the plurality of ground truth sensor value ranges 210. As another example, assuming the particular relevant agricultural area is supposed to be in Texas, the synthetic sensor data 281 may include one or more instances of synthetic sensor data indicating that it is currently 35 degrees Fahrenheit during one or more time periods when sensor data that measures ambient light corresponds to lighting conditions in Summer for the Northern Hemisphere. As another example, the synthetic sensor data 281 may include successive instances of synthetic sensor data indicating a higher level of variability between ratios of air temperature and relative humidity measurements than the plurality of ground truth sensor value ranges 210 dictate should occur (e.g., ratios one would more likely encounter during monsoon season in Southeast Asia than at any time in Texas).

In implementations in which imagery is included in the ground truth sensor data 200, the plurality of ground truth sensor value ranges 210 may include indications and/or models of qualities or quantities that should be present in the ground truth sensor data 200. In these implementations, the synthetic sensor data 281 may include synthetic and/or modified images that violate one or more of these indications or models, and/or ground truth vision data associated with a sufficiently different agricultural region (e.g., Oklahoma, the Amazonian rainforest, etc.) that, when processed by the ground truth analysis model(s) 250, would be found to violate these indications and/or models included in the ground truth sensor value ranges 210 for the particular agricultural area(s) that correspond to the ground truth sensor data 200. In some implementations, the synthetic sensor data 281 may include sequences of successive instances of vision data depicting crops that can be grown in particular agricultural area, but the sequences of vision data may exhibit different growing patterns and/or rates of growth atypical for the particular agricultural area and/or for the other depicted conditions of the vision data.

The ground truth agricultural conditions 230 generated by the one or more ground truth analysis model(s) 250 include agricultural conditions of the one or more particular agricultural regions that correspond to the ground truth sensor data 200, and therefore also correspond to the plurality of ground truth sensor value ranges 210 indicating the sensor values, value ranges, and mathematical relationships between such for the agricultural conditions that are actually present in the particular agricultural area(s). Ground truth agricultural conditions 230 may include indications crop conditions, climate conditions, edaphic conditions, landform conditions, and so forth. Crop conditions may include, for instance, information about crop identification, crop pheno- type expression, crop life stage, crop rate of growth, expected crop yield, weed identification and prevalence, plant disease, and so forth. Climate conditions may include, for instance, precipitation levels/frequencies, temperatures, sunlight exposure, wind, humidity, evapotranspiration (the sum of evaporation from the land surface plus transpiration from plants), and so forth. Edaphic conditions may include various information about soil, such as soil composition, soil pH, soil moisture, fraction data, soil organic carbon content, etc. Landform conditions may include, for instance, eleva- tion, slope, distance to water, the presence of man-made materials or structures, etc. In general, any condition which may have any relevance to or influence on crop growth and health in a particular agricultural area and which may be determined based on analyzing ground truth sensor data 200 may be reflected in the plurality of ground truth agricultural conditions 230. The ground truth agricultural conditions 230 can also indicate one or more changes and/or rates of change in ground truth agricultural conditions expected to be found in the ground truth sensor data 200 across and between various periods of time (e.g., as indicated by time-stamped instances of sensor data and/or some other sensor values that indicate time passage, such as temperature cycles between seasons).

In some implementations, the ground truth agricultural conditions 230 can also include synthetic data generated based on the ground truth sensor data 200. For example, ground truth imagery included in the ground truth sensor data may be modified or otherwise used to generate syn- thetic imagery that depicts various instances of ground truth agricultural conditions 230 indicated by the ground truth sensor data 200 for which there may be no ground truth vision data, or for which the ground truth vision data is low quality.

These ground truth agricultural conditions 230 can be processed using a synthetic agricultural conditions generator 253 (which itself may or may not apply a machine learning model) to generate a plurality of synthetic agricultural conditions 220. The synthetic agricultural conditions gen- erator 253 can comprise, or be included in, one or more of the machine learning models described herein. The plurality of synthetic agricultural conditions 220 generated by the synthetic agricultural conditions generator 253 include agri- cultural conditions that do not correspond to the ground truth sensor data 200. For example, if an instance of ground truth sensor data 200 indicates a temperature of 100 degrees Fahrenheit and a relative humidity of 80%, then one or more instances of synthetic agricultural conditions 230 generated based on such may indicate that it is relatively "cold" or "arid" outside, rather than "hot" or "humid". In other words, the synthetic agricultural conditions 230 may be generated to include one or more agricultural conditions that would be considered anomalous for the particular agricultural area for which the agricultural inference machine learning model is being trained, or generated to at least contrast with the ground truth sensor data in some way.

Alternatively or additionally, the plurality of synthetic agricultural conditions 230 may indicate a crop growth rate or crop growth model determined using a relative humidity to temperature ratio of 0.7, instead of the 0.8 ratio indicated by the ground truth sensor data 200. In instances in which the ground truth sensor data 200 includes image or other vision data capturing ground truth agricultural conditions in the particular agricultural area(s), the generated plurality of synthetic agricultural conditions 283 can include ground truth or synthetic vision data capturing one or more agri- cultural conditions that do not occur in the particular agri- cultural area(s) corresponding to the ground truth sensor data 200. For example, if the ground truth sensor data 200 corresponds to a particular agricultural area in Texas, then the plurality of synthetic agricultural conditions 283 can include ground truth imagery corresponding to Alaska or synthetic imagery generated based on modifying ground truth imagery that corresponds to Texas (e.g., to include conditions not found in Texas, or uncommon in Texas and more commonly found in another region like Alaska).

Together, the ground truth sensor data 200, the plurality of ground truth sensor value ranges 210, the plurality of ground truth agricultural conditions 230, the synthetic sensor data 281, and the synthetic agricultural conditions 220 can be used to train an agricultural inference machine learning model, such as the edge agricultural inference machine learning model 155 of FIG. 1, to provide users in the particular authorized agricultural area(s) with valuable infer- ences about their local agricultural conditions, while pre- venting bad actors in unauthorized agricultural areas from making effective use of the model. The training of the agricultural inference machine learning model will be described in more detail below with respect to FIG. 3.

FIG. 3 illustrates an example process 300 for training an agricultural inference machine learning model, as described herein. For convenience, the operations of the flowchart are described with reference to a system that performs the operations. This system may include various components of various computer systems, such as one or more components of the client device(s) 106, the edge agricultural inference system 104, the training system 150, and/or the AG client(s) 107. For example, the agricultural inference machine learn- ing model of FIG. 3 may be the edge agricultural inference machine learning model 155 of FIG. 1. Moreover, while operations of process 300 are shown in a particular order, this is not meant to be limiting. One or more operations may be reordered, omitted, or added.

At block 310, the system accesses ground truth sensor data for a particular agricultural area. As described else- where herein, this ground truth sensor data can be retrieved or otherwise obtained from various authoritative sources for the particular agricultural area, such as government regula- tory or outreach programs, agricultural personnel, and sen- sors and software implemented on robot(s), aerial drones, and so forth.

At block 320, the ground truth sensor data is processed, e.g., using one or more machine learning models, in order to determine ground truth data at sub-block 320A and deter- mine synthetic data at sub-block 320B. The ground truth data obtained at 320A is determined to include: (1) a plurality of ground truth agricultural conditions of the par- ticular agricultural area correlated with and/or indicated by the ground truth sensor data, and (2) a plurality of ground truth sensor value ranges indicated by the ground truth sensor data and corresponding to the plurality of ground truth agricultural conditions determined for the particular agricultural area based on the ground truth sensor data. The synthetic data obtained at 320B is determined to include: (1) a plurality of synthetic agricultural conditions that are not indicated by the ground truth sensor data for the particular agricultural area, and (2) synthetic sensor data that falls outside of the plurality of ground truth sensor value ranges indicated by the ground truth sensor data for the particular agricultural area.

At block 330, a plurality of training instances are generated based on the ground truth data obtained at 320A, the synthetic data obtained at 320B, and the ground truth sensor data obtained at block 310 and used to generate the ground truth data at 320A and the synthetic data at 320B. Generating the plurality of training instances includes generating first training instances at sub-block 330A and generating second training instances at sub-block 330B. The first training instances generated at 330A include first input(s) indicating ground truth sensor data that falls within one or more of the plurality of ground truth sensor value ranges and first output(s) indicating ground truth agricultural conditions that correspond to the respective one or more of the plurality of ground truth sensor value ranges indicated by the corresponding first input(s). For example, a first input of a training instance may include ground truth sensor data captured during a particular period of time and/or during a particular period of certain criteria being met, such as ground truth sensor data gathered while soil is below a certain temperature threshold (e.g., the "cold" season temperature period, which may or may not precisely correspond to the "Winter" season time period). The ground truth sensor data included in this first input will be correlated with one or more of the plurality of ground truth sensor value ranges. For example, the ground truth sensor data to be included in the first input may be generated and/or selected based on conformance to one or more corresponding ground truth sensor value ranges. The corresponding first output for this first training instance may include ground truth agricultural conditions that are correlated with the respective one or more of the plurality of ground truth sensor value ranges associated with the ground truth sensor data included in the first input. For example, if the ground truth sensor data included in the first input is generated based on sensor data that was gathered in a Lanesville, Texas soybean field on Apr. 3, 2022 at 6:00 AM and again on Apr. 4, 2022 at 2:00 PM, then one or more of the plurality of ground truth sensor value ranges will dictate the sensor values, value ranges, mathematical relationships between sensor values and/or value ranges, etc. that correspond to these instances of sensor data gathering (e.g., corresponding to these instances separately, to the commonalities between the instances, to a combined instance, etc.).

In this example, the corresponding first output of this first training instance may include one or more of: ground truth agricultural conditions that precisely correspond to the instances of sensor data used to generate the first input (e.g., determined based on the same sensor data gathered on April 3-4 and/or the portions of that sensor data that were actually used to generate the first input); ground truth agricultural conditions that correspond to ground truth sensor data gathered in or nearby Lanesville, Texas and on or near April 3-4 (e.g., neighboring farm sensor data); or ground truth agricultural conditions that correspond to similar ground truth sensor data as the ground truth sensor data that was included in or used to generate the first input (e.g., where similarity may be defined by or determined based on one or more of the plurality of ground truth sensor value ranges).

The second training instances generated at 330B include second input(s) indicating synthetic sensor data that falls outside of one or more of the plurality of ground truth sensor value ranges and second output(s) indicating one or more of the synthetic agricultural conditions that do not correspond to the ground truth sensor data for the particular agricultural area(s). In some implementations, the synthetic agricultural conditions indicated by the second output(s) may not necessarily correspond to the synthetic sensor data included in the second input(s) either.

For example, the second input(s) and the second output(s) included in the second training instances may be randomized, or may be selected such that at least one synthetic agricultural condition included in a given second output will not correspond to the synthetic sensor data indicated by the corresponding given second input for a given second training instance of the second training instances 330B. In some implementations, the second input and second output of a given training instance may correspond to one another, but neither may correspond to at least one of the plurality of ground truth sensor value ranges determined for the particular agricultural area for which the agricultural inference machine learning model is to be trained. For example, the particular agricultural area for which the model is to be trained may be Lanesville, Texas, and the synthetic sensor data included in the second input and the synthetic agricultural conditions included in the second output may correspond to the same or one or more similar instances of sensor data gathered in Austin, Texas or in Chang Rai, Thailand.

At block 340, the agricultural inference machine learning model is trained, based on the plurality of training instances, to perform the operations of sub-blocks 340A and/or 340B when the trained agricultural inference machine learning model receives subsequent ground truth sensor data. The agricultural inference machine learning model can be trained based on first training instances with "valid" inputs and outputs, the inputs and outputs being "valid" in that they each correspond to one or more of the plurality of ground truth sensor value ranges expected to be found in the particular agricultural area for which the model is trained, and based on second training instances with "invalid" or "ambiguous" inputs and outputs, the inputs and outputs being "invalid" when they do not correspond to one another in some way (e.g., inputs based on Thailand and outputs based on Alaska, inputs from Summer and outputs from Winter, etc.) or being "ambiguous" when they do correspond to one another, but do not correspond to the plurality of ground truth sensor value ranges for the particular agricultural area for which the model is being trained (e.g., if sensor data gathered in Alaska in June is used as an input to a Texas model, the output might include inferences about crop growth for July that would be correct only if the current "cold snap" were to end suddenly and normal Texas Summer temperatures were to return, and thus the output will include crop growth inferences that are not going to be accurate for either Alaska or Texas come July).

Subsequently, when the trained agricultural inference machine learning model receives one or more instances ground truth sensor data, the trained agricultural inference machine learning model may perform the operations detailed at sub-block 340A and/or 340B based on conformance between the subsequent ground truth sensor data and the plurality of ground truth sensor value ranges for the particular area for which the agricultural inference machine learning model was trained.

At sub-block 340A, when the trained agricultural inference machine learning model subsequently receives ground truth sensor data that falls within bounds of the plurality of ground truth sensor value ranges, the trained agricultural inference machine learning model will generate valid agricultural inferences for agricultural conditions based on the ground truth sensor data. Thus, for example, an agricultural inference machine learning model trained for a particular region in Texas would output valid agricultural inferences for agricultural conditions for that particular region in Texas, when the received ground truth sensor data conforms to the plurality of ground truth sensor value ranges expected to be found in that particular region in Texas.

At sub-block 340B, when the trained agricultural inference machine learning model subsequently receives ground truth sensor data that falls within outside of one or more of the plurality of ground truth sensor value ranges for the particular agricultural area, the trained agricultural inference machine learning model will generate invalid or ambiguous agricultural inferences of agricultural conditions that do not conform, at least in part, to the received ground truth sensor data and/or to the true agricultural conditions found at the location associated with the ground truth sensor data. Thus, for example, an agricultural inference machine learning model trained for a particular region in Texas that receives ground truth sensor data that a bad actor obtained in Washington could output agricultural inferences of agricultural conditions that are not supported by the ground truth sensor data and/or that would be invalid (e.g., non-existent) or ambiguous (e.g., improbable) for either Washington or Texas. The invalid or ambiguous agricultural inferences of agricultural conditions will include one or more agricultural inferences and/or agricultural conditions that do not conform to the ground truth sensor data and/or various agricultural inferences and/or agricultural conditions generated such that, when all of the agricultural inferences of agricultural conditions are presented together, include conflicting or ambiguous information.

In some instances, the generating of the plurality of training instances at block 330 may further include generating a third set of training instances (not depicted). These third training instances may include third inputs and third outputs. The third inputs can include additional synthetic sensor data (not depicted) generated based on the accessed ground truth sensor data. The instances of additional synthetic sensor data used as the third inputs may be generated and/or selected to include pairs (or other multiples) of sensor values or measurements that individually fall within one or more corresponding ground truth sensor value ranges, but which when taken together violate some mathematical relationship with respect to one another that is indicated for one or more corresponding ground truth sensor values included in the plurality of ground truth sensor value ranges. For example, the plurality of ground truth sensor value ranges may dictate that the temperature should be above 32 degrees Fahrenheit and that relative humidity should be below 100% for a given week of Summer for a given authorized agricultural area in Texas. Thus, a third input for a given third training instance may indicate temperatures above 32 degrees Fahrenheit and relative humidities below 100%. However, the plurality of ground truth sensor value ranges may also indicate a threshold level of covariance between temperature and humidity sensor values expected for the given week of Summer for the given authorized agricultural area in Texas, and the temperatures and humidities indicated by this third input may "violate" that expected range and exhibit a higher/lower or positive/negative covariance or other correlation that is outside of the expected threshold level of covariance or correlation defined by the corresponding plurality of ground truth sensor value ranges. Corresponding third outputs for these third training instances will include one or more of the synthetic agricultural conditions that were generated at sub-clock 320B (e.g., synthetic agricultural conditions that are not indicated by the ground truth sensor data for the particular agricultural area).

In implementations in which block 330 includes generating these third training instances, block 340 may further include training the agricultural inference machine learning model based on the third training instances. Thus, the agricultural inference machine learning model may likewise be trained at block 340 to output "invalid" or ambiguous agricultural inferences when subsequently received ground truth sensor data includes individual ground truth sensor values that satisfy one or more corresponding ground truth sensor value ranges, but which, when taken together, are outside of one or more ratios, thresholds, or other mathematical relationships defined by the plurality of ground truth sensor value ranges.

FIG. 4 illustrates an example process for processing sensor data based on an agricultural inference machine learning model to generate invalid inferences based on sensor data that falls outside of one or more expected ground truth sensor value ranges and to generate valid inferences based on sensor data that falls within the one or more expected ground truth sensor value ranges. For convenience, the operations of the flowchart are described with reference to a system that performs the operations. This system may include various components of various computer systems, such as one or more components of the client device(s) 106, the edge agricultural inference system 104, the training system 150, and/or the AG client(s) 107. For example, the agricultural inference machine learning model of FIG. 4 may be the edge agricultural inference machine learning model 155 of FIG. 1. Moreover, while operations of process 400 are shown in a particular order, this is not meant to be limiting. One or more operations may be reordered, omitted, or added.

At block 410, the system accesses an agricultural inference machine learning model that was trained previously to perform operations set forth in sub-blocks 410A and 410B. The operations of sub-block 410A include generating invalid inferences based on sensor data that falls outside of one or more expected ground truth sensor value ranges. The operations of sub-block 410B include generating valid inferences based on sensor data that falls within the one or more expected ground truth sensor value ranges.

The sensor data can include vision and other sensor data that is and may be associated with sub-regions of one or more particular agricultural areas, or even fields or particular positional coordinates within such field(s) in those particular agricultural areas. For example, in some implementations, the sensor data may include ground truth observational data gathered and/or derived from user input and sensor output related to soil composition (e.g., soil aeration, moisture, organic carbon content, etc.), agricultural management (e.g., crop plantings, plant identification, crop rotation, crop yields, irrigation, tillage practices, weeding practices, etc.), terrain (e.g., land elevation, slope, erosion, etc.), climate or weather (e.g., precipitation levels/frequency, temperatures, sunlight exposure, wind, humidity, etc.), and any other features, occurrences, or operational practices that could affect the agricultural conditions of the field(s) in the one or more particular agricultural areas and which could be identified based on analyzing sensor output and/or user input and/or generated based on such identified data.

In some implementations, the one or more expected ground truth sensor value ranges can include ground truth sensor value ranges determined to correspond to a same or different particular agricultural area than the one or more particular agricultural areas for which the agricultural inference machine learning model was previously trained, as described herein. The one or more expected sensor value ranges can include expected sensor values, value ranges, and mathematical relationships between such. In some implementations, the one or more expected ground truth sensor value ranges can include ground truth sensor value ranges determined based on one or more rules, regulations, operational practices, or desired or predicted conditions or changes in agricultural conditions the agricultural inference machine learning model was trained to expect in agricultural field(s) of a particular agricultural area.

For example, the agricultural machine learning model may have been previously trained to treat sensor data associated with certain pesticides as falling outside of the one or more expected ground truth sensor value ranges. Thus, at sub-block 410A, the agricultural inference machine learning model generates invalid inference output (e.g., non-corresponding output, or ambiguous output) based on sensor data input that indicates presence of those certain pesticides.

As another example, the agricultural machine learning model may have been previously trained to treat any vision sensor data occurring within a certain amount of time or number of image frames of capturing a particular object or condition as falling within the one or more expected ground truth sensor values. Thus, at sub-block 410B, the agricultural machine learning model may process vision data input that includes one or more image frames capturing recognized features of particular farms, plants, machinery, farm personnel, etc. in order to generate valid inference output based on that sensor data.

At block 420, the system receives sensor data generated by one or more sensors for a particular agricultural area for which the agricultural inference model was not trained, wherein the sensor data generated by the one or more sensors falls outside the one or more expected ground truth sensor value ranges.

At block 430, the system processes the sensor data based on the agricultural inference machine learning model to generate invalid or ambiguous agricultural inferences of one or more agricultural conditions in the particular agricultural area.

Figure 5:
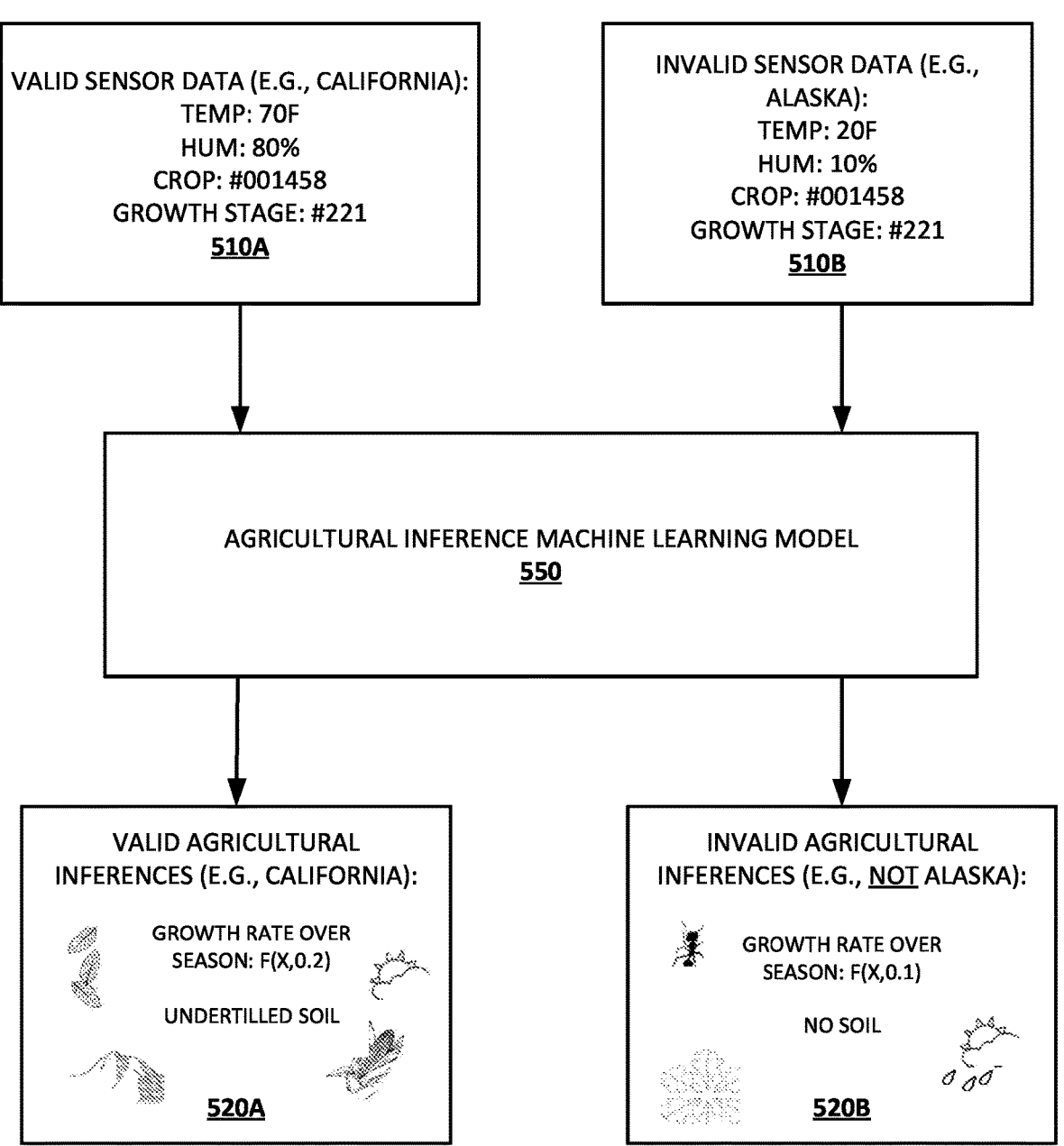
FIG. 5 illustrates an example information flow for processing ground truth sensor data using a trained agricultural inference machine learning model to make inferences about agricultural conditions, as described herein.

FIG. 5 illustrates an example information flow for processing ground truth sensor data using a trained agricultural inference machine learning model 550 to make inferences about agricultural conditions, as described herein. For convenience, the operations of this flow of information are described with reference to a system that performs the operations. This system may include various components of various computer systems, such as one or more components of the client device(s) 106, the edge agricultural inference system 104, the training system 150, and/or the AG client(s) 107. For example, the agricultural inference machine learning model 550 of FIG. 5 may be the edge agricultural inference machine learning model 155 of FIG. 1. Moreover, while the components of FIG. 5 are depicted as interacting with one another in a particular direct/indirect way or order, this is not meant to be limiting. One or more other operations or components may be reordered, omitted, or added.

The agricultural inference machine learning model 550 of FIG. 5 is trained based on ground truth sensor data for the agricultural area of California, for example using one or more processes described with respect to any one of FIGS. 1-4 above. Thus, the agricultural inference machine learning model 550 is trained such that California will be treated as an "authorized agricultural area" and/or that personnel using the agricultural inference machine learning model 550 with sensor data that corresponds to California will be treated as "authorized users" of the agricultural inference machine learning model 550, and the agricultural inference machine learning model 550 will return valid agricultural inferences about agricultural conditions in the particular agricultural area (e.g., one or more particular farms or fields within California) that is associated with the sensor data input. If a bad actor attempts to use the agricultural inference machine learning model 550, however, with sensor data corresponding to a different agricultural area than California, or at least not corresponding to a plurality of ground truth sensor value ranges or other indications of expected sensor values for California, then the agricultural inference machine learning model 550 will recognize that the input sensor data corresponds to an "unauthorized agricultural area" and/or "unauthorized user". Thus, this sensor data input will be treated as "invalid", and the agricultural inference machine learning model 550 will output invalid and/or ambiguous agricultural inferences of agricultural conditions for the particular "unauthorized agricultural area" from which the sensor data input was gathered.

Block 510A depicts "valid" sensor data to be applied to the agricultural inference machine learning model 550. The sensor data of block 510A is "valid" because it includes ground truth sensor data that was gathered in California, the agricultural area for which the agricultural inference machine learning model was trained, and thus it will conform to a plurality of sensor values, value ranges, or other mathematical relationships between sensor values that are expected to be found in California. For example, the sensor data of block 510A may include ground truth sensor values indicating that it is 70 degrees Fahrenheit, that there is 80% relative air humidity, that cucumber crops are present (e.g., imagery with shapes that conform to crop identifier #001458), and their growth stage identifier (#221) which, in this example, may correspond to a cucumber crop growth stage associated with healthy, mature cucumbers that are ready for harvest.

Block 510B depicts "invalid" sensor data to be applied to the agricultural inference machine learning model 550. The sensor data of block 510B is "invalid" because it includes ground truth sensor data that was gathered in Alaska, when the particular agricultural area for which the agricultural inference machine learning model was trained is California, and thus this ground truth sensor data will not conform to the plurality of sensor value ranges expected to be found in California. For example, the sensor data of block 510B may include ground truth sensor values indicating that it is a mere 32 degrees Fahrenheit outside and that there is only 10% relative air humidity, while the same variety of cucumber crops at the same growth stage as those indicated by the valid sensor data of block 510A (e.g., crop identifier #001458 and growth stage identifier #221) are present.

The "valid" sensor data of block 510A and the "invalid" sensor data of block 510B will each be applied to (one or more instances of) the agricultural inference machine learning model 550 which has been trained based on ground truth sensor data for the authorized agricultural area of California.

The "valid" sensor data of block 510A conforms to the plurality of sensor values, value ranges, or other mathematical relationships between sensor values that the agricultural inference machine learning model 550 expects to find in the authorized agricultural area of California (e.g., climate=early fall, cucumbers=ready to harvest). Consequently, the agricultural inference machine learning model 550 may treat the sensor data of block 410A as a "valid" input and provide, as corresponding output, "valid" agricultural inferences about agricultural conditions 520A for the particular agricultural area within California from which it was gathered. The output agricultural inferences about agricultural conditions 520A will be "valid" in that they will correspond to agricultural conditions actually found (or expected to be found) in the particular agricultural area in California from which the sensor data of block 510A was gathered. For example, the valid agricultural inferences about agricultural conditions 520A output by the agricultural inference machine learning model 550 in FIG. 5 indicate that the soil is undertilled and include agricultural inferences deduced based on a determined equation or other model F(X, 0.2), which includes a value or weight of 0.2 for one or more variables, that characterizes a predicted growth rate for the cucumber crops over one or more future or past time periods. For example, the equation or model F(X, 0.2) may indicate that the net percentage of cucumber crops that will spoil over the next two weeks if the cucumbers are not picked is 0.2% per day (e.g., the spoiled cucumbers, minus newly ripened cucumbers, as a percentage of the total number of currently harvestable cucumbers).

The "invalid" sensor data of block 510B will not conform to the plurality of sensor values, value ranges, or other mathematical relationships between sensor values that the agricultural inference machine learning model 550 expects to find in the authorized agricultural area of California (e.g., climate data corresponds to winter in California, which is not when cucumbers are ready to harvest). Consequently, the agricultural inference machine learning model 550 will treat the sensor data of block 510B as an "invalid" input and provide, as corresponding output, "invalid" agricultural inferences about agricultural conditions 520B for the particular agricultural area within Alaska from which it was gathered. The output agricultural inferences about agricultural conditions 520B will be "invalid" in that, when viewed as a whole, they will not correctly characterize the agricultural conditions, or agricultural inferences about such conditions, that would be expected to be found in the particular agricultural area within Alaska which the sensor data of block 510B corresponds to. While one or more of the "invalid" agricultural inferences of agricultural conditions 520B may technically be correct, at least one other of the "invalid" agricultural inferences of agricultural conditions 520B will be incorrect or ambiguous, and therefore, on the whole, the "invalid" agricultural inferences of agricultural conditions 520B will paint an "invalid" or ambiguous picture of the agricultural conditions, or the agricultural inferences made based on such.

For example, the invalid agricultural inferences about agricultural conditions 520B output by the agricultural inference machine learning model 550 in FIG. 5 include agricultural inferences deduced based on a determined condition of "no soil" (e.g., based on standard hydroponic growing practices, or based on imaginary conditions in which the cucumber plants float in the air as they grow) as well as a determined equation or other model F(X, 0.1), which includes a value or weight of 0.1 for one or more variables, that characterizes a predicted growth rate for the cucumber crops over one or more future or past time periods. For example, the equation or model F(X, 0.1) may indicate that the net percentage of cucumber crops that will spoil over the next two weeks if the cucumbers are not picked is 0.1% per day.

In some cases, while these corresponding output agricultural inferences about agricultural conditions 520B may not be incorrect, they may be ambiguous or omit other information that would more correctly and/or less ambiguously characterize the agricultural conditions that would actually be found in the unauthorized agricultural area from which the sensor data of block 510B was corrected. For example, the rates of ripened cucumber spoilage in the unauthorized agricultural area in Alaska from which the sensor data of block 510B was gathered may actually be the same 0.2% per day figure as would be found in the authorized agricultural area within California from which the sensor data of block 510A was gathered. Thus, it is not completely incorrect to say that 0.1% of the cucumbers will spoil per day in the field(s) in Alaska. However, that is only a partial picture of the agricultural conditions for those field(s) in Alaska, since many more cucumbers than that will spoil per day as well.

Thus, in some cases, a bad actor who has attempted to clone the agricultural inference machine learning model 550 and deploy it in the unauthorized agricultural area of Alaska may not be aware that the agricultural inference machine learning model 550 is providing invalid or ambiguous agricultural inferences about agricultural conditions 520B for the particular field(s) in Alaska. Rather, this bad actor may merely believe that his or her excess cucumber spoilage is due to personnel inefficiencies or unpredictable weather conditions occurring after the agricultural inferences 520B were made. Nonetheless, this bad actor will not be able to enjoy the full benefits of the trained agricultural inference machine learning model 550 even in cases where many or all agricultural factors relevant to a given agricultural inference or condition are similar across the authorized and unauthorized agricultural areas (e.g., similar growing conditions in early Spring in California as the middle of Summer in Alaska), because there is bound to be at least one sensor data point (e.g., daylight hours, minute differences in soil composition, etc.) that betray the true location where the "invalid" sensor data was gathered.

Figure 6:
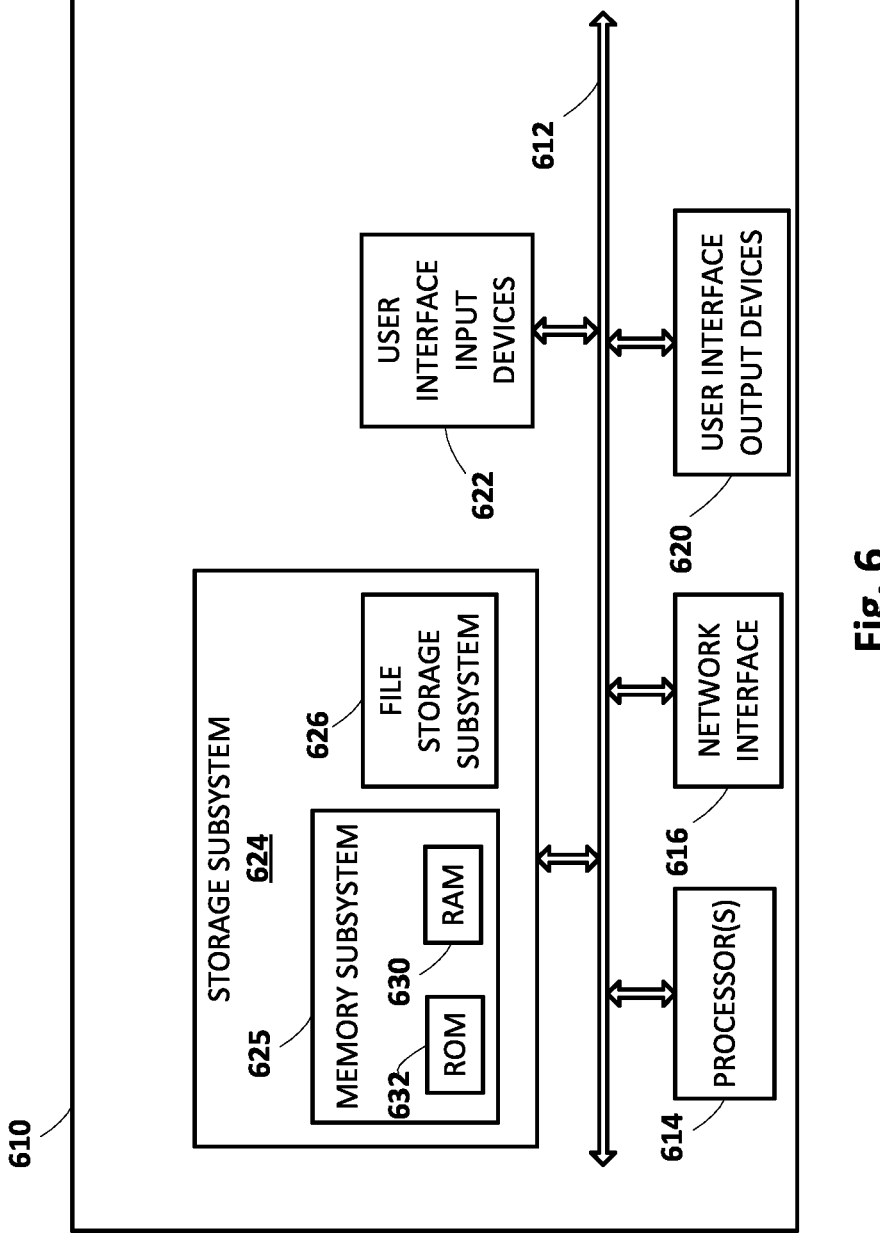
FIG. 6 illustrates an example architecture of a computing device.

FIG. 6 is a block diagram of an example computing device 610 that may optionally be utilized to perform one or more aspects of techniques described herein. For example, computing device 610 may comprise an edge computing node that includes edge agricultural inference system 104 of FIG. 1. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the various methods and components depicted and described herein with respect to FIGS. 1-5.

These software modules are generally executed by processor 614 alone or in combination with other processors. Memory subsystem 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 615.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, an edge computing node, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A digital rights management (DRM) method implemented using one or more processors, comprising:

accessing ground truth sensor data for a particular agricultural area;

determining ground truth agricultural conditions, present in the particular agricultural area, that are correlated with the ground truth sensor data;

determining a plurality of ground truth sensor value ranges for the ground truth agricultural conditions of the particular agricultural area indicated by the ground truth sensor data;

generating, based on the ground truth sensor data and the plurality of ground truth sensor value ranges, synthetic sensor data that fall outside of the plurality of ground truth sensor value ranges;

generating, based on the ground truth sensor data and the determined ground truth agricultural conditions, a plurality of synthetic agricultural conditions;

generating a plurality of training instances including:

first training instances each including ground truth sensor data input falling within one or more of the plurality of ground truth sensor value ranges and ground truth output corresponding to one or more of the ground truth agricultural conditions that are correlated with the respective one or more of the plurality of ground truth sensor value ranges, and second training instances each including synthetic sensor data input that falls outside of one or more of the ground truth sensor value ranges and synthetic output corresponding to one or more of the synthetic agricultural conditions;

training an agricultural inference machine learning model based on the plurality of training instances to:

generate valid agricultural inferences of agricultural conditions based on subsequently received ground truth sensor data when the subsequently received ground truth sensor data includes sensor data values that fall within the plurality of ground truth sensor value ranges;

generate invalid or ambiguous agricultural inferences of agricultural conditions based on the subsequently received ground truth sensor data when the subsequently received ground truth sensor data includes sensor data values that fall outside the plurality of ground truth sensor value ranges;

capturing, using one or more vision sensors on a farming machine in the particular agricultural area as the farming machine travels through a field of crops, images of the crops in the field in the particular agricultural area;

applying the trained agricultural inference machine learning model to the images to generate agricultural inferences about the crops in the field; and performing, using the farming machine, one or more operational practices in the particular agricultural area, the one or more operational practices determined based on the generated agricultural inferences.

2. The DRM method of claim 1, wherein the ground truth sensor data includes vision data capturing the particular agricultural area, and wherein the synthetic sensor data includes synthetic vision data depicting one or more of the plurality of synthetic agricultural conditions.

3. The DRM method of claim 1, wherein the plurality of training instances further includes one or more third training instances each including additional synthetic sensor data input and synthetic output corresponding to one or more of the synthetic agricultural conditions, wherein the additional synthetic sensor data input includes at least two synthetic sensor data values that fall within corresponding ground truth sensor value ranges and exhibit a threshold level of difference in covariance compared to observed covariance between the corresponding ground truth sensor value ranges.

4. The DRM method of claim 1, further comprising accessing additional ground truth sensor data for one or more different agricultural areas.

5. The DRM method of claim 4, wherein determining the plurality of ground truth sensor value ranges for the agricultural conditions of the particular agricultural area further includes determining the plurality of ground truth sensor value ranges based on the additional ground truth sensor data.

6. The DRM method of claim 4, wherein generating the synthetic sensor data is further based on at least a portion of the additional ground truth sensor data that indicates one or more additional ground truth agricultural conditions not included in the determined plurality of ground truth agricultural conditions.

7. The DRM method of claim 6, wherein determining the plurality of ground truth sensor value ranges further includes determining the plurality of ground truth sensor value ranges based on the at least the portion of the additional ground truth sensor data.

8. The DRM method of claim 1, wherein generating the synthetic sensor data includes substituting a noise signal for one or more sensor values included in the ground truth sensor data.

9. The DRM method of claim 1, wherein training the agricultural inference machine learning model to generate the valid agricultural inferences of agricultural conditions includes training the agricultural inference machine learning model to generate an indication of an operational practice associated with a predicted change in the ground truth sensor value ranges.

10. The DRM method of claim 1, wherein the plurality of synthetic agricultural conditions are anomalous for the particular agricultural area.

11. The DRM method of claim 1, wherein the plurality of synthetic agricultural conditions contrast with the ground truth sensor data.

12. A system, comprising:
one or more processors; and
memory storing instructions that, when executed by at least one of the one or more processors, cause the one or more processors to perform operations comprising:
   accessing ground truth sensor data for a particular agricultural area;
   determining ground truth agricultural conditions, present in the particular agricultural area, that are correlated with the ground truth sensor data;
   determining a plurality of ground truth sensor value ranges for the ground truth agricultural conditions of the particular agricultural area indicated by the ground truth sensor data;
   generating, based on the ground truth sensor data and the plurality of ground truth sensor value ranges, synthetic sensor data that fall outside of the plurality of ground truth sensor value ranges;
   generating, based on the ground truth sensor data and the determined ground truth agricultural conditions, a plurality of synthetic agricultural conditions;
   generating a plurality of training instances including:

first training instances each including ground truth sensor data input falling within one or more of the plurality of ground truth sensor value ranges and ground truth output corresponding to one or more of the ground truth agricultural conditions that are correlated with the respective one or more of the plurality of ground truth sensor value ranges, and second training instances each including synthetic sensor data input that falls outside of one or more of the ground truth sensor value ranges and synthetic output corresponding to one or more of the synthetic agricultural conditions;

training an agricultural inference machine learning model based on the plurality of training instances to:

generate valid agricultural inferences of agricultural conditions based on subsequently received ground truth sensor data when the subsequently received ground truth sensor data includes sensor data values that fall within the plurality of ground truth sensor value ranges;

generate invalid or ambiguous agricultural inferences of agricultural conditions based on the subsequently received ground truth sensor data when the subsequently received ground truth sensor data includes sensor data values that fall outside the plurality of ground truth sensor value ranges capture, using one or more vision sensors on a farming machine in the particular agricultural area as the farming machine travels through a field of crops, images of the crops in the field in the particular agricultural area;

apply the trained agricultural inference machine learning model to the images to generate agricultural inferences about the crops in the field; and perform, using the farming machine, one or more operational practices in the particular agricultural area, the one or more operational practices determined based on the generated agricultural inferences.

13. The system of claim 12, wherein the ground truth sensor data includes vision data capturing the particular agricultural area, and wherein the synthetic sensor data includes synthetic vision data depicting one or more of the plurality of synthetic agricultural conditions.

14. The system of claim 12, wherein the plurality of training instances further includes one or more third training instances each including additional synthetic sensor data input and synthetic output corresponding to one or more of the synthetic agricultural conditions, wherein the additional synthetic sensor data input includes at least two synthetic sensor data values that fall within corresponding ground truth sensor value ranges and exhibit a threshold level of difference in covariance compared to observed covariance between the corresponding ground truth sensor value ranges.

15. The system of claim 12, further comprising accessing additional ground truth sensor data for one or more different agricultural areas.

16. The system of claim 15, wherein determining the plurality of ground truth sensor value ranges for the agricultural conditions of the particular agricultural area further includes determining the plurality of ground truth sensor value ranges based on the additional ground truth sensor data.

17. The system of claim 15, wherein generating the synthetic sensor data is further based on at least a portion of the additional ground truth sensor data that indicates one or more additional ground truth agricultural conditions not included in the determined plurality of ground truth agricultural conditions.

18. The system of claim 17, wherein determining the plurality of ground truth sensor value ranges further includes determining the plurality of ground truth sensor value ranges based on the at least the portion of the additional ground truth sensor data.

19. A digital rights management (DRM) method implemented using one or more processors and comprising:

accessing, from a farming machine, an agricultural inference machine learning model that was trained previously to:

generate invalid inferences based on sensor data that falls outside of one or more expected ground truth sensor value ranges, and generate valid inferences based on sensor data that falls within the one or more expected ground truth sensor value ranges;

receiving sensor data generated by one or more sensors for a particular agricultural area for which the agricultural inference machine learning model was not trained, wherein the sensor data generated by the one or more sensors falls outside of the one or more expected ground truth sensor value ranges;

processing the sensor data based on the agricultural inference machine learning model to generate invalid or ambiguous agricultural inferences of one or more agricultural conditions in the particular agricultural area, wherein the sensor data includes vision data captured using one or more vision sensors on the farming machine in the particular agricultural area as the farming machine travels through a field of crops;

performing, using the farming machine, one or more operational practices in the particular agricultural area, the one or more operational practices determined based on the generated agricultural inferences.

* * * * *